(12) United States Patent
Dani et al.

(10) Patent No.: US 6,763,372 B1
(45) Date of Patent: Jul. 13, 2004

(54) LOAD BALANCING OF CHAT SERVERS BASED ON GRADIENTS

(76) Inventors: Nishant V. Dani, 24110 SE 35$^{th}$ Pl., Issaquah, WA (US) 98029; Farookh P. Mohammed, 11835 NE 162$^{nd}$ Ct., Bothell, WA (US) 98011

( * ) Notice: Subject to any disclaimer, the term of this patent is extended or adjusted under 35 U.S.C. 154(b) by 632 days.

(21) Appl. No.: 09/611,314

(22) Filed: Jul. 6, 2000

(51) Int. Cl.$^7$ .............................................. G06F 15/16
(52) U.S. Cl. ...................................... 709/204; 718/105
(58) Field of Search ................................ 709/224, 105, 709/227, 203, 204; 718/105

(56) References Cited

U.S. PATENT DOCUMENTS

| | | | | |
|---|---|---|---|---|
| 6,259,705 | B1 * | 7/2001 | Takahashi et al. | 370/465 |
| 6,314,465 | B1 * | 11/2001 | Paul et al. | 709/226 |
| 6,560,717 | B1 * | 5/2003 | Scott et al. | 714/4 |
| 6,578,077 | B1 * | 6/2003 | Rakoshitz et al. | 709/224 |
| 6,675,199 | B1 * | 1/2004 | Mohammed et al. | 709/208 |
| 6,675,217 | B1 * | 1/2004 | Dani et al. | 709/229 |

* cited by examiner

*Primary Examiner*—Mehmet B. Geckil

(57) ABSTRACT

A method for determining a load distribution for a plurality of servers is disclosed. A total user count during a predetermined interval of time is received from each server of a plurality of servers for all channel resources associated with each respective server of the plurality of servers. A present load distribution is determined for the predetermined interval of time for each respective server of the plurality of servers based on the total user count received from each server. A load gradient is determined for the predetermined interval of time from each server of the plurality of servers. A future load distribution is determined for each respective server based on the total user count for each server and each respective load gradient. Lastly, a load distribution for each respective channel resource is distributed among the plurality of servers based on the determined future load distribution for each respective channel resource. The predetermined interval of time is a sliding window of time having a predetermined number of timeslots each having a predetermined timeslot interval. Additionally, a load gradient for a server is based on a difference between the total number of users connected to the server at the end of the predetermined interval of time and the total number of users connected to the server at the beginning of the predetermined interval of time. When a new channel resource is created, an initial estimated weight is assigned to the new channel resource. The new channel resource is then assigned to a selected server of the plurality of servers based on the initial estimated weight associated with the new channel resource and a load distribution associated with each respective server of the plurality of servers.

18 Claims, 9 Drawing Sheets

LOAD BALANCING OF CHAT SERVERS BASED ON GRADIENTS

CROSS-REFERENCE TO RELATED APPLICATIONS

The present application is related to U.S. patent application Ser. No. 09/611,318, entitled "Identification of Active Server Cluster Controller," invented by F. Mohammed et al., and to U.S. patent application Ser. No. 09/611,313, entitled "Recovery of Cluster Consistency Following Failover," invented by N. Dani et al., both of which are incorporated by reference herein and filed concurrently herewith.

TECHNICAL FIELD

The present invention relates to the field of computer network servers. More particularly, the present invention relates to a method for determining and balancing loads among a plurality of servers.

BACKGROUND OF THE INVENTION

In a conventional cluster of chat servers, the load presented by users connecting to new and existing channels is unpredictable. Consequently, some of the chat servers of the cluster may become overloaded, while other chat servers may be significantly underutilized.

What is needed is a technique for predicting the load presented by new users connecting to new and existing channels of a server cluster and using the predicted load for balancing and distributing users among the servers of the server cluster.

SUMMARY OF THE INVENTION

The present invention provides a technique for predicting the load presented by new users connecting to new and existing channels of a server cluster and using the predicted load for balancing and distributing users among the servers of the server cluster. The present invention uses a measure of past and current load patterns to assign channels in a balanced manner among the servers of a chat server cluster.

The advantages of the present invention are provided by a method for determining a load distribution for a plurality of servers. A total user count at periodic time-slices is received from each server of a plurality of servers. A load gradient is then calculated for a predetermined interval of time for each server of the plurality of servers. A present load distribution is determined for the predetermined interval of time for each respective server of the plurality of servers based on the total user count received from each server. A future load distribution is determined for each respective channel resource for each respective server based on the total user count for each server and the respective load gradient. Lastly, new channel resources are distributed among the plurality of servers based on the determined future load distribution for each server. According to the invention, the predetermined interval of time is a sliding window of time having a predetermined number of timeslots each having a predetermined timeslot interval. Preferably, the sliding window of time spans about 60 seconds and the predetermined timeslot interval is about 5 seconds. Additionally, a load gradient for a server is based on a difference between the total number of users connected to the server at the end of the predetermined interval of time and the total number of users connected to the server at the beginning of the predetermined interval of time. When a new channel resource is created, the new channel is assigned to a selected server of the plurality of servers based on the load distribution associated with each respective server of the plurality of servers. The channel resource is assigned an initial estimated weight that is credited to the current server at the current timeslot.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE INVENTION

Although not required, the invention will be described in the general context of computer-executable instructions, such as program modules, that are executed by a personal computer or a server. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
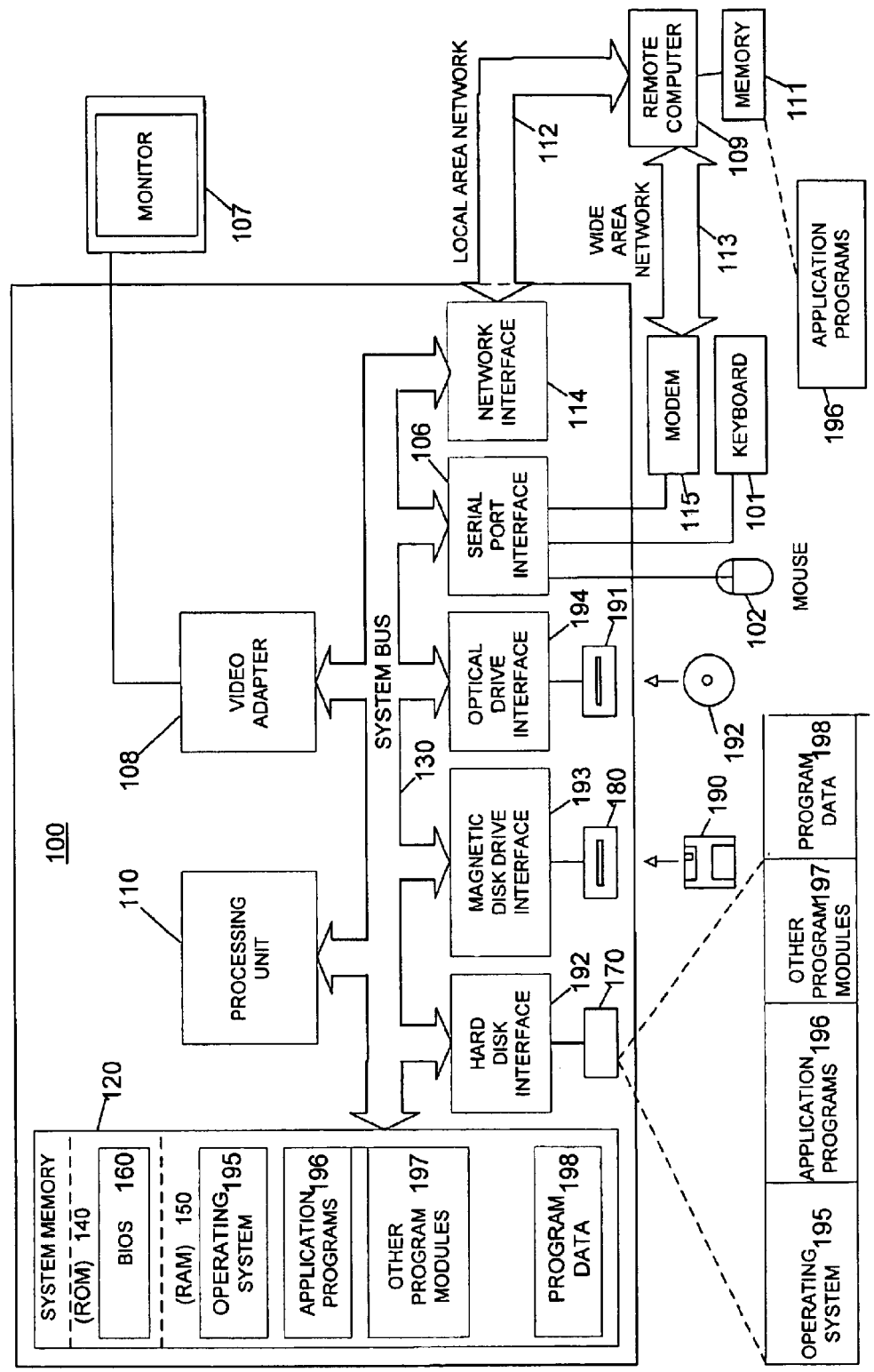
FIG. 1 is a schematic diagram of a conventional general-purpose digital computing environment that can be used to implement various aspects of the invention.

FIG. 1 is a schematic diagram of a conventional general-purpose digital computing environment that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random, access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input devices, such as a keyboard 101 and a pointing device 102. Other input devices (not shown) may include a microphone, joystick, game pad, satellite dish, scanner, or the like. These and other input devices are of ten connected to the processing unit 110 through a serial port interface 106 that is coupled to the system bus, but may be connected by other interfaces, such as a parallel port, a game port, a universal serial bus (USB) or through a PCI board. A monitor 107 or other type of display device is also connected to system bus 130 via an interface, such as a video adapter 108. In addition to the monitor, personal computers typically include other peripheral output devices (not shown), such as speakers and printers.

Computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 typically includes a modem 115 or other means for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

It will be appreciated that the network connections shown are exemplary and other ways of establishing a communications link between the computers can be used. The existence of any of various well-known protocols, such as TCP/IP, Ethernet, FTP, HTTP and the like, is presumed, and the system can be operated in a client-server configuration to permit a user to retrieve web pages from a web-based server. Any of various conventional web browsers can be used to display and manipulate data on web pages. A primary aspect of the invention provides a failover algorithm that synchronously and automatically allows servers in a server cluster to determine the identity of the active server cluster controller.

The failover algorithm ensures that each server will properly identify which controller is active at any particular time, including, but not limited to, upon starting up or bootstrapping the server cluster, upon adding one or more servers to a cluster that is already operating, and upon failure of an active controller, one or more servers, or a link between an active controller and a server.

Figure 2:
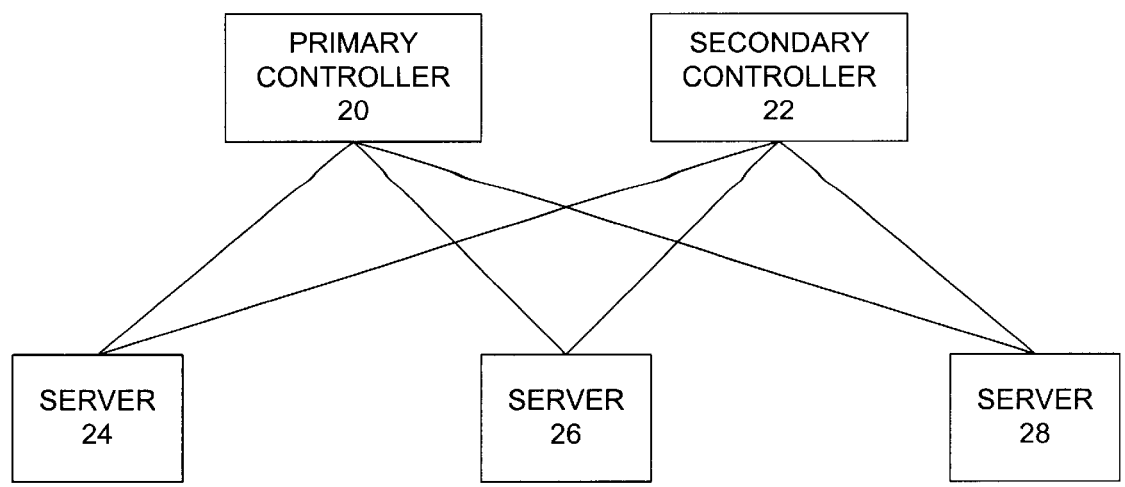
FIG. 2 is a schematic diagram of a server cluster including three servers each coupled to both a primary controller and a secondary controller.

Referring to FIG. 2, a schematic view of a simple server cluster is shown. The server cluster includes servers 24, 26, and 28, each of which is coupled in a well-known manner to two servers designated as primary controller 20 and secondary controller 22.

Figure 3:
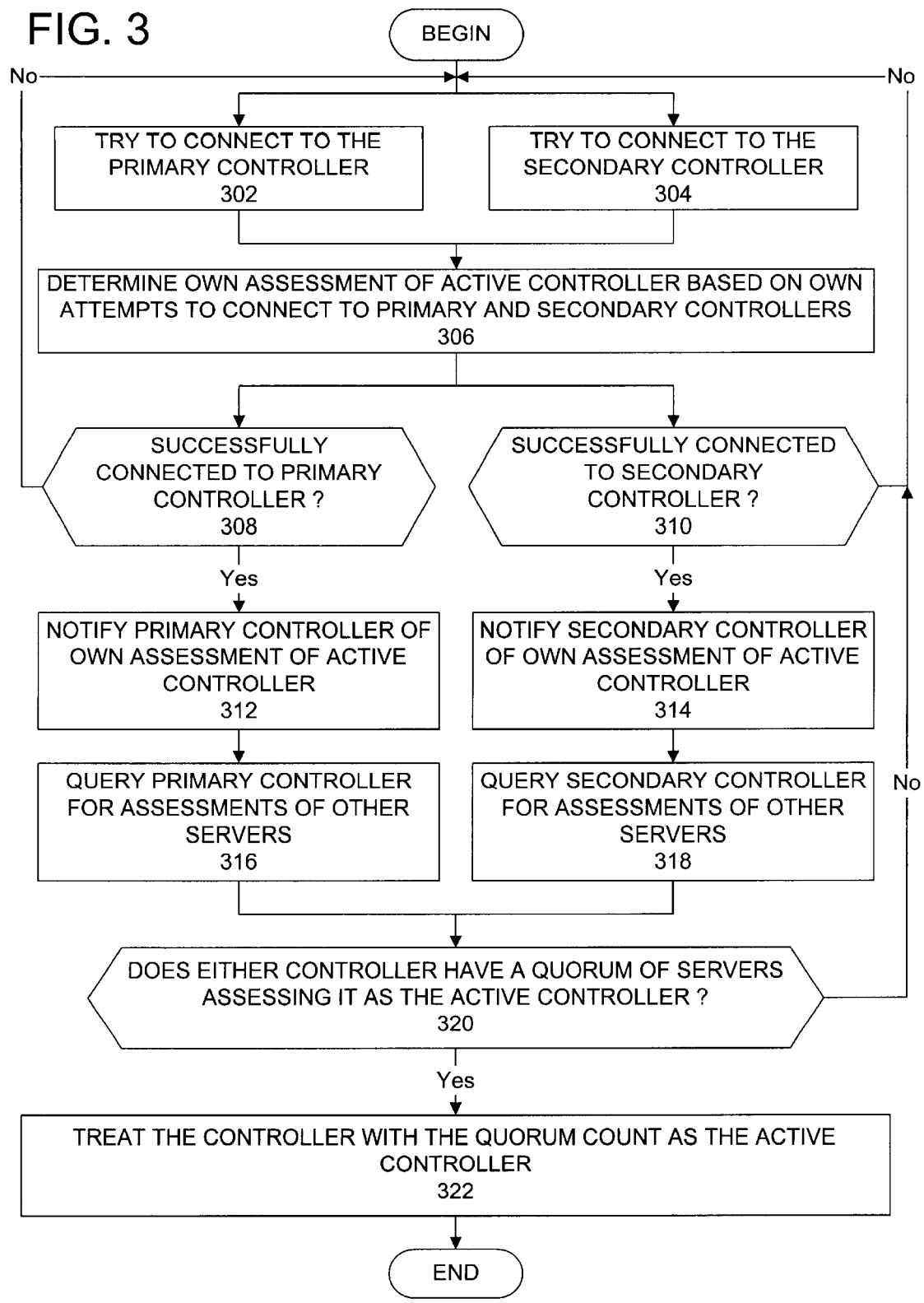
FIG. 3 shows a flow diagram for choosing either the primary controller or the secondary controller as the active server cluster controller.

FIG. 3 shows a flow chart of steps that may be performed by servers, such as server 24, 26, and 28 to determine whether primary controller 20 or secondary controller 22 is active at any particular time. For instance, when any of servers 24, 26, and 28 are brought into service, by performing the steps set forth in FIG. 3, any such server may determine which controller is active. Although any number of servers may simultaneously be attempting to determine which controller is active, FIG. 3 will be discussed in the context of server 24 determining which controller is active.

At steps 302 and 304, server 24 attempts to connect to primary controller 20 and secondary controller 22, respectively. At step 306, server 24 makes a determination of its own assessment of which controller is active based upon success or failure in establishing a connection with either or both controllers. If a connection is successfully established with both primary controller 20 and secondary controller 22, then server 24 may assess one of the controllers as the active controller in accordance with a predetermined strategy, such as, for instance, assessing primary controller 20 as the active controller. If a connection is successfully established with one controller but not the other controller, then server 24 makes an own assessment of the active controller as the controller to which a successful connection was established. If the attempts to establish a connection between server 24 and both controllers fails, then steps 302 through 310 are repeated in a loop that will terminate upon successfully establishing a connection to either or both controllers.

Upon successfully connecting to primary controller 20, the yes branch from step 308 is taken. Similarly, upon successfully connecting to secondary controller 22, the yes branch from step 310 is taken. At steps 312 and 314, server 24 notifies the controllers of the assessment that server 24 has made as to which controller is active. This assessment is referred to as an own assessment of the active controller because it is not based on the assessments made by any of the other servers in the cluster as to which controller is active.

At steps 316 and 318, server 24 queries primary controller 20 and secondary controller 22 for the assessments of other servers in the cluster. Primary controller 20 may respond to such a query by sending the assessments of the other servers in the cluster, which have notified controller 20 of each of those servers' own assessments of the active controller. Similarly, secondary controller 22 may respond to such a query by sending the assessments of the other servers in the cluster, which have notified controller 20 of each of those servers' own assessments of the active controller.

At step 320, server 24 makes a determination regarding whether either primary controller 20 or secondary controller 22 has a quorum of servers assessing that particular controller as the active controller. A quorum is preferably defined as at least a majority of the number of servers in the cluster, not including the primary and secondary controllers. For instance, in the server cluster shown in FIG. 2, a quorum would preferably be at least 2. If there is not at least a quorum of servers assessing either of the controllers as the active controller, then the no branch is taken from step 320 and steps 302 through 320 are repeated. Because each server preferably assesses only one controller as the active controller, and because a quorum is preferably defined as at least a majority of the servers, excluding the controllers, the situation in which a quorum of servers assesses both of the controllers as the active controller is preferably avoided. If one of the controllers has a quorum of servers assessing that controller as the active controller, then the yes branch is taken from step 320 to step 322. At step 322, server 24 treats as the active controller the controller with the quorum count of servers assessing it as the active controller, which is also referred to herein as the consensus active controller.

Figure 4:
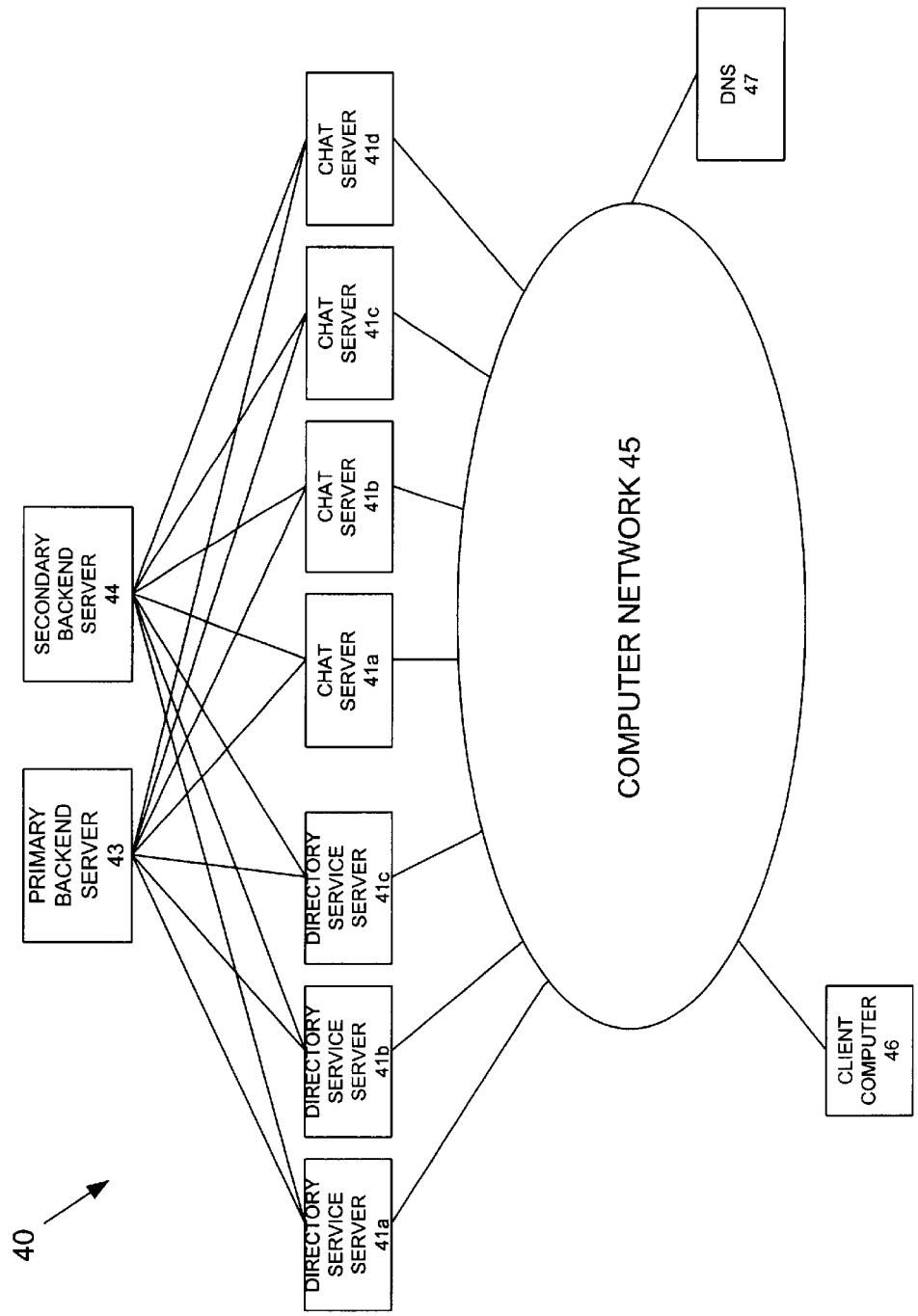
FIG. 4 shows a schematic block diagram of a server cluster that is suitable for the load prediction and balancing technique of the present invention according to the present invention.

Referring to FIG. 4, the failover algorithm described above may be used to detect a failure of the active controller, ;which in the cluster server shown in FIG. 4 may be either primary backend server 43 or secondary backend server 44. The failover algorithm may have directory service servers 41a, 41b and 41c and chat servers 42a, 42b, 42c, and 42d each perform the steps depicted in FIG. 3. While groups of chat servers, such as the directory service servers and the chat servers may have their own quorum counts, a consensus active controller is preferably determined based upon a quorum of substantially all servers in the server cluster.

Another primary aspect of the invention provides a predictive load balancer for distributing and balancing channels (chatrooms) and users (clients) among a plurality of chat servers. This aspect of the invention will be described with reference to FIGS. 4–6.

FIG. 4 shows a schematic block diagram of a server cluster 40 that is suitable for the load prediction and balancing technique of the present invention. Server cluster 40 includes a plurality of directory service servers 41a, 41b and 41c, a plurality of chat servers 42a, 42b, 42c and 42d, a primary backend server 43 and a secondary backend server 44. Directory service servers 41a–41c and chat servers 42a–42d are each connected to a computer network 45, such as the Internet, in a well-known manner. Each of directory service servers 41a–41c and chat servers 42a–42d are connected to each of primary backend server 43 and secondary backend server 44 in a well-known manner. Primary backend server 43 is designated as the active backend server during system initialization and provides well-known backend services, such as administrative functions and resource ownership monitoring. Secondary backend server 44 is designated as the inactive backend server during system initialization and operates as a backup backend server. In the event of a failover, secondary backend server 44 becomes the active backend server, as described above/elsewhere in this disclosure. While three directory service servers 41a–41c and four chat servers 42a–42d are shown in FIG. 4, any number of directory service servers 41 and any number of chat servers 42 can be used in server cluster 40.

Directory service servers 41a–41c provide well-known directory service functions for a chatroom environment. For example, when a user accesses any of directory service servers 41a–41c and requests to enter an already existing chatroom (channel resource), the particular chatrooms existing on server computers 42a–42d are known to each of the directory service servers. The user is then redirected and connected to the requested chatroom.

In the situation when a user accesses a directory service server and requests a chatroom that does not exist on any of the chat servers, the directory service server assigns the new chatroom to a selected chat server 42a–42d based on present and future load distributions for the various chat servers 42a–42d the cluster 40. The process used for determining the present and future load distributions among chat servers 42a–42d is described in greater detail below. The directory service server sends a message to the active backend server containing information relating to the channel resource assignment to the selected chat server. The active backend server in turn sends a message to the selected chatroom server notifying the selected chat server of the channel resource assignment. The active backend server also sends a message to each of the other directory service servers so that new users requesting the newly created chatroom can be redirected accordingly. The active backend server sends a message to each directory service servers 41a–41c and the particular chat server 42 to which the chatroom has been assigned. The directory service server requesting assignment of the channel resource then redirects the user to the appropriate chat server in a well-known manner.

A user at client computer 46 that is connected to computer network 45, and who desires to enter a chatroom hosted by server cluster 40, accesses one of the directory service servers 41a–41c in a well-known manner. That is, a browser application program operating on client computer 46 responds to a computer network address, such as a domain name, entered by the user by accessing a domain name service (DNS) 47 in a well-known manner for obtaining the computer network address, or universal resource, locator (URL), for the domain name. DNS 47 sends a return message to the browser in client computer 46 containing the URL for the desired domain name. The browser then sends a page request message to one of the directory service servers 41a–41c. The page request message is routed through computer network 45 in a well-known manner and is directed to the particular directory service server 41a–41c corresponding to the URL.

Figure 5:
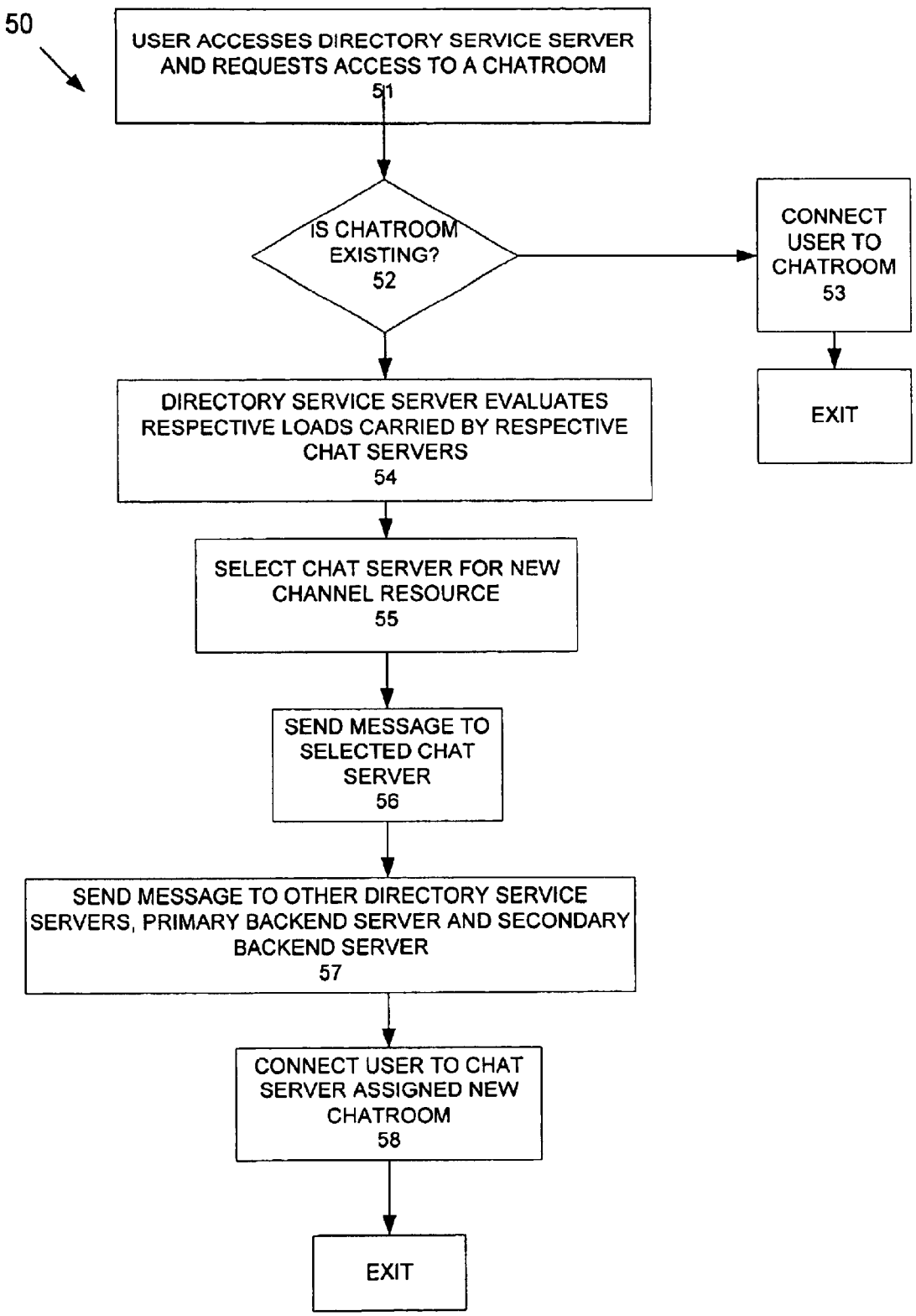
FIG. 5 shows a flow diagram for determining the present and future load distributions for chat servers of a chat server cluster.

FIG. 5 shows a flow diagram 50 for determining the present and future load distributions for chat servers of a chat server cluster according to the present invention. At step 51, a user (client) accesses a directory service server 42 and requests access to a chatroom be created. At step 52, the directory service server determines whether the requested chatroom exists. If so, flow continues to step 53 where the user is connected to the existing chatroom. If, at step 52, the requested chatroom is not yet existing, flow continues to step 54 where the directory service server evaluates the loads carried by the respective chat servers of the chat server cluster for determining which chat server to assign the new chatroom (channel resource). A chat server is selected based on the present loads and the future load estimations for each respective chat server so that the loads carried by each chat server will be balanced.

Figure 6:
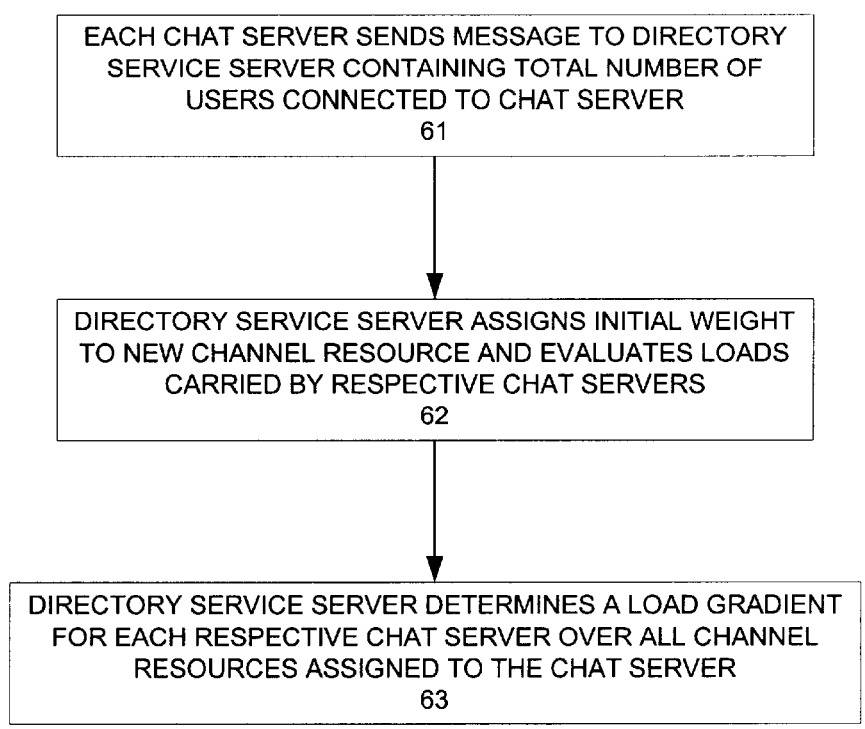
FIG. 6 shows a flow diagram setting forth the details of evaluating the loads carried by the respective chat servers of the chat server cluster and selecting a chat server for a new channel resource.

FIG. 6 shows a flow diagram 60 setting forth the details of evaluating the loads carried by the respective chat servers 42 of the chat server cluster and selecting a chat server for a new channel resource. The flow chart of FIG. 6 corresponds to step 54 in FIG. 5. At step 61, each chat server sends a message to the directory service server indicating the total number of users (clients) connected to the chat server during a predetermined time interval for all channel resources assigned to the chat server. At step 62, the directory service server assigns an initial estimated weight to the newly created channel. The estimated weight is a measure of the number of users expected to join the channel, and is used to initially influence the future load prediction for the server until the load on the newly created channel ramps up and a load gradient on the channel can be explicitly determined. At step 63, the directory service server determines a load gradient for each respective chat server over all channels resources assigned to the chat server.

Each respective chat server 42a–42d updates the directory service servers 41a–41c with its total user count (weight) at every timeslot. Directory service servers 41 use the gradient and weight for each chat server 42a–42d for predicting the future load for each respective chat server. The load distribution among the chat servers is then balanced based on the gradients and weights provided by the respective chat servers.

Figure 7:
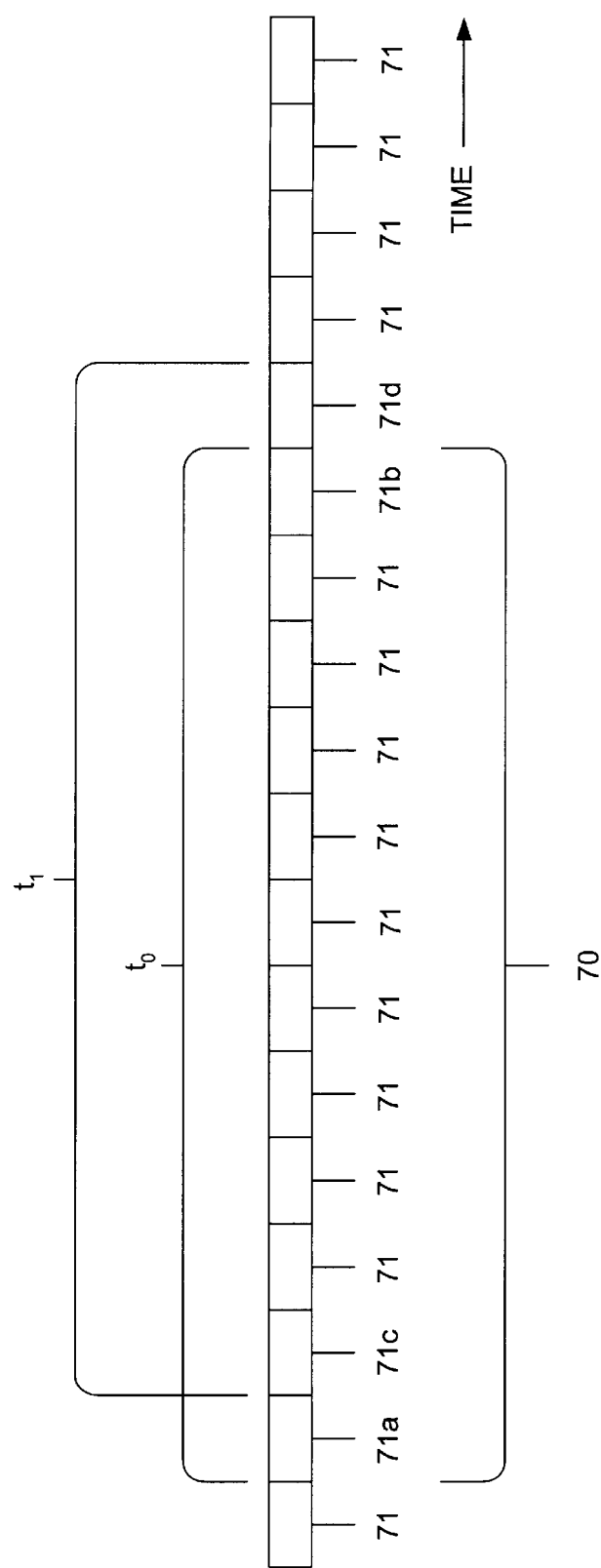
FIG. 7 shows an exemplary sliding window having a plurality of timeslots that are used for determining a load gradient of a chat server according to the present invention.

FIG. 7 shows an exemplary sliding window of time 70 having a plurality of timeslots 71 that are used for determining a load gradient of a chat server according to the present invention. Preferably, sliding window 70 spans about 60 seconds and each time slot 71 preferably spans about five (5) seconds (twelve slots per sliding window). The load gradient for a chat server is preferably calculated by determining the difference between the total number of users (all channels) connected to the server in a current timeslot and the total number of users (all channels) connected to the server in a timeslot occurring 60 seconds earlier. For example, an exemplary load gradient for a chat server is calculated by subtracting the total number of users on the chat server at timeslot 71a from the total number of users on the chat server at time slot 71b. Of course, a sliding window having a different time span than 60 seconds can be used. Similarly, a timeslot having a time interval different from 5 seconds can also be used.

As time progresses, the window slides to include a new current timeslot, while excluding an earlier timeslot that now is outside of the sliding window. That is, the sliding window at time to includes timeslots between timeslots 71a and 71b, inclusive. At subsequent time $t_1$, the sliding window includes timeslots between timeslots 71c and 71d.

Returning to FIG. 5, at step 55, the directory service server selects a chat server for assigning the new channel resource based on the current and future loads and the current load gradients. The selection can be based on, for example, an equitable load balancing policy so that each chat server carries about the same amount of traffic, or any other suitable load balancing policy. At step 56, the directory service server sends a message to the selected chat server informing the chat server of the newly assigned channel resource, in addition to the estimated weight for the new channel. The selected chat server adds the initial estimated weight for the new channel to the total number of users in the current timeslot of the sliding window. The assigned chat server and the directory server use the estimated weight until the load on the newly created channel ramps up and a load gradient on the channel can be explicitly determined.

At step 57, a message is sent to each of the other directory service servers indicating the assignment of the new channel resource. At step 58, the directory service server connects the user to the new chatroom.

The present invention is not limited to a chat server cluster environment, but is applicable to any server cluster environment in which resources and clients are assigned among a plurality of servers.

Yet another primary aspect of the invention provides a technique for determining a consistent state for a server cluster, such as resource ownership for a chat server cluster, in situations in which one or more chat servers in the cluster temporarily lose and subsequently regain connection to the server cluster. This aspect of the present invention also determines a consistent state of a server cluster after a failover, that is, when the server cluster switches from a primary backend server to a secondary backend server as a result of a failure of the primary backend server. This aspect of the invention will be described with reference to FIGS. 4, 8 and 9.

According to this aspect of the invention, when a server disconnects and subsequently reconnects, or when a failover occurs, the current ownership of resources assigned among the servers of a server cluster is redetermined and any contention for a resource among servers of the cluster is resolved.

Figure 8:
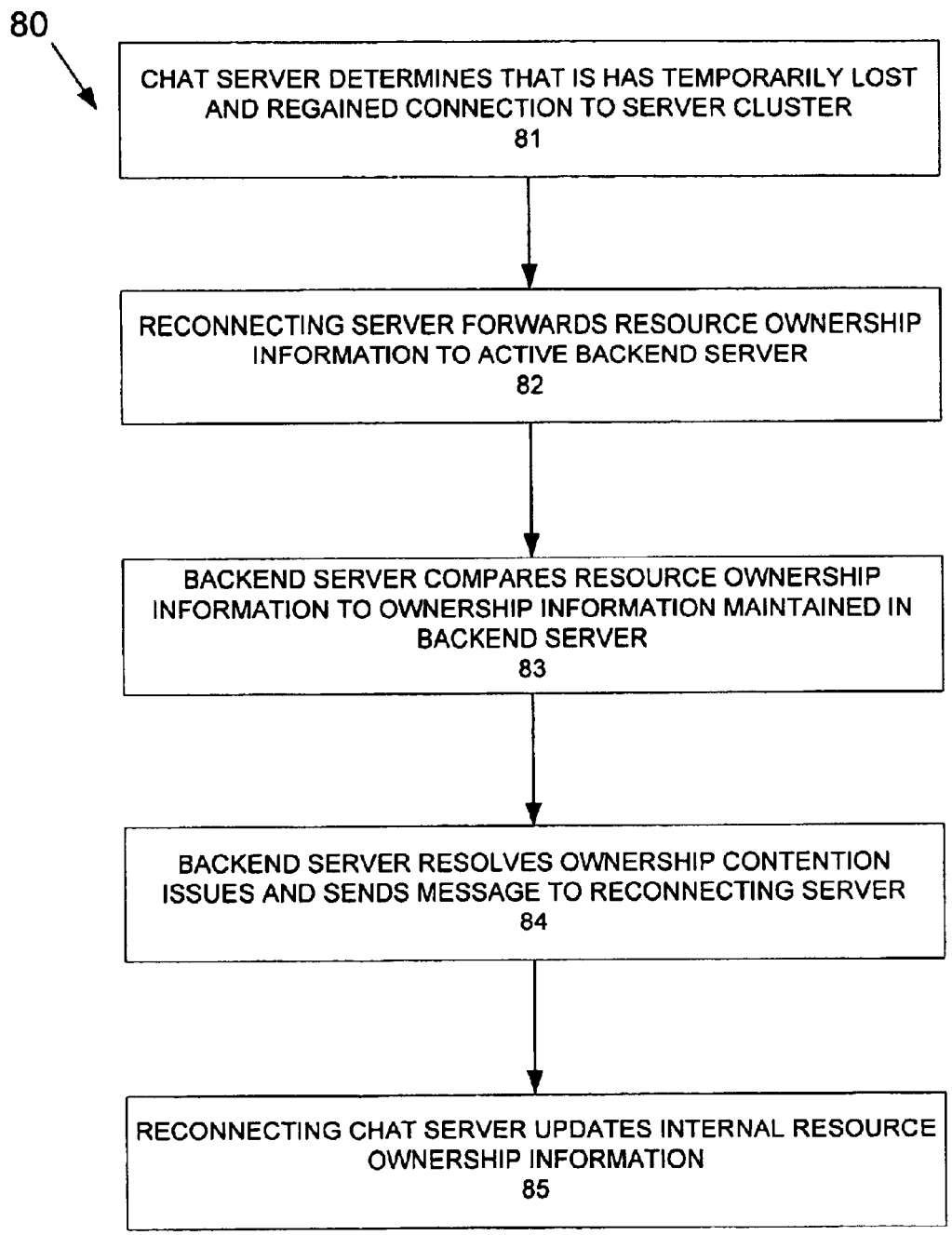
FIG. 8 shows a flow diagram for determining a consistent state of a server cluster when one or more chat servers in the cluster temporarily lose and regain connection to the rest of the server cluster according to the present invention.

FIG. 8 shows a flow diagram 80 for determining a consistent state of a server cluster when one or more chat servers in the cluster temporarily lose and subsequently regain connection to the rest of the server cluster. At step 81, a chat server 42 determines that it has temporarily lost and regained connection to the server cluster 40 and begins the process of determining a consistent state of the cluster. At step 82, the reconnecting chat server forwards resource ownership information to the active backend server for both static and dynamic resources maintained by the server internally. A static resource is, for example, a channel (chatroom) that is perpetually open, such as a "cars" chatroom. A dynamic resource is, for example, a chatroom that is created on an as needed basis, such as a "bicycle tire repair" chatroom.

At step 83, the active backend server compares the resource ownership information received from the reconnecting chat server with resource ownership information maintained within the active backend server. At step 84, the active backend server resolves ownership contention issues for both static and dynamic resources and a resource ownership response message is sent to the reconnecting server. At step 85, the reconnecting chat server then updates its internal resource ownership information by discarding any resources indicated to no longer be owned by the reconnecting server, adding any resources that (from the point of view of the reconnecting server) are newly assigned, and maintaining any resources that have been verified to be owned by the reconnecting server.

Figure 9:
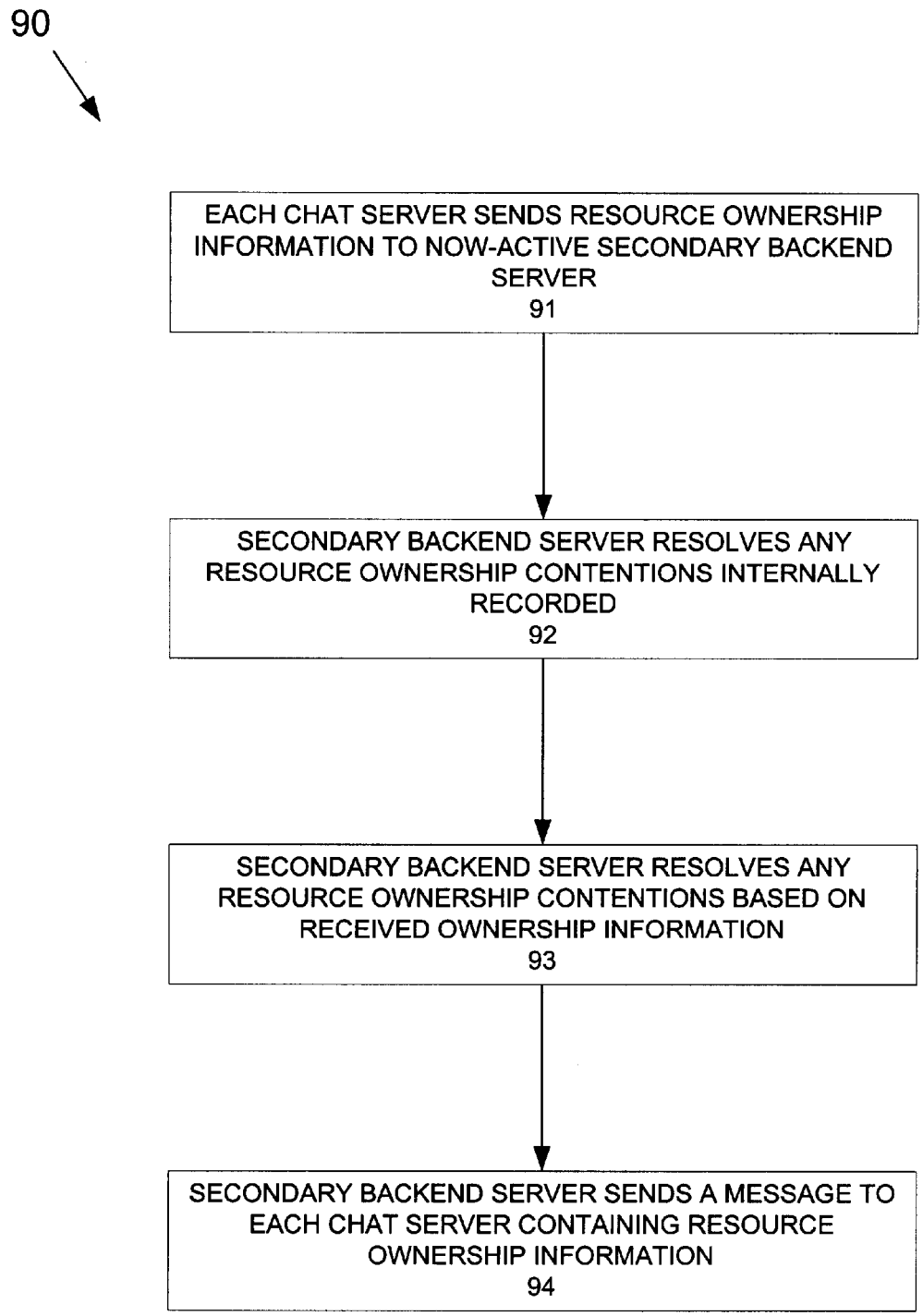
FIG. 9 shows a flow diagram determining a consistent state for a server cluster for the situation of a failover according to the present invention.

FIG. 9 shows a flow diagram 90 for determining a consistent state for a server cluster for the situation of a failover. In such a situation, the secondary backend server cannot rely on ownership information received from the failed primary backend server. The process begins at step 91 where, just after the failover, each chat server 42 of the cluster sends resource ownership information for each resource it internally owns to the now-active secondary backend server 44 for verification. At step 92, secondary backend server 44 resolves any contention for any static resources that the second backend server already has recorded internally. At step 93, secondary backend server 44 then verifies each resource indicated to be owned by each chat server 42 and resolves any contention for the same resource when the resource ownership information received from chat servers 42 indicates that multiple servers own the resource. At step 94, the backend server sends a message to each chat server 42 responding to the ownership information from each chat server. At step 95, each chat server then updates its internal resource ownership information by discarding any resources indicated to no longer be owned by the chat server, adding any resources that (from the point of view of the server) are newly assigned, and maintaining any resources that have been verified by active backend server 44. The active backend server maintains resource ownership information for all of the resources that were sent by the servers for verification and were successfully verified. The backend server also updates all directory services with the new resource ownership information.

Of course, this aspect of the present invention is not limited to a chat server cluster environment, but is applicable to any server cluster environment in which resources and clients are assigned among a plurality of servers.

While the present invention has been described in connection with the illustrated embodiments, it will be appreciated and understood that modifications may be made without departing from the true spirit and scope of the invention.

What is claimed is:

1. A method for determining a load distribution for a plurality of servers, the method comprising steps of:
   receiving a total user count during a predetermined interval of time from each server of a plurality of servers for at least one channel resource associated with each respective server of the plurality of servers;
   determining a present load distribution for the predetermined interval of time for each respective server of the plurality of servers based on the total user count received from each server;
   determining a load gradient for the predetermined interval of time for each server of the plurality of servers; and
   determining a future load distribution for each respective channel resource for each respective server based on the total user count for each server and each respective load gradient.

2. The method according to claim 1, wherein the predetermined interval of time is a sliding window of time having a predetermined number of timeslots each having a predetermined timeslot interval.

3. The method according to claim 2, wherein the sliding window of time spans about 60 seconds and the predetermined timeslot interval is about 5 seconds.

4. The method according to claim 1, further comprising a step of distributing a load distribution for each respective channel resource among the plurality of servers based on the determined future load distribution for each respective server.

5. The method according to claim 4, wherein at least one load gradient is based on a difference between a total number of users connected to the server associated with the load gradient at an end of the predetermined interval of time and a total number of users connected to the server at a beginning of the predetermined interval of time.

6. The method according to claim 4, further comprising steps of:
   creating a new channel resource;
   assigning an initial estimated weight to the new channel resource; and
   assigning the new channel resource to a selected server of the plurality of servers based on the initial estimated weight associated with the new channel resource and a load distribution associated with each respective server of the plurality of servers.

7. A method for determining a load gradient for a server of a plurality of servers, the method comprising steps of:
   recording a number of users connected to the server at a beginning of a predetermined interval of time;
   recording a number of users connected to the server at an end of the predetermined interval of time; and
   determining a difference between the total number of users connected to the server at the end of the predetermined interval of time and the total number of users connected to the server at the beginning of the predetermined interval of time.

8. The method according to claim 7, wherein the predetermined interval of time is a sliding window of time having a predetermined number of timeslots each having a predetermined timeslot interval.

9. The method according to claim 8, wherein the sliding window of time spans about 60 seconds and the predetermined timeslot interval is about 5 seconds.

10. A computer-readable medium having computer-executable instructions for performing steps comprising:
    receiving a total user count during a predetermined interval of time from each server of a plurality of servers for at least one channel resource associated with each respective server of the plurality of servers;
    determining a present load distribution for the predetermined interval of time for each respective server of the plurality of servers based on the total user count received from each server;
    determining a load gradient for the predetermined interval of time from each server of the plurality of servers; and
    determining a future load distribution for each respective channel resource for each respective server based on the total user count for each server and each respective load gradient.

11. The computer-readable medium according to claim 10, wherein the predetermined interval of time is a sliding window of time having a predetermined number of timeslots each having a predetermined timeslot interval.

12. The computer-readable medium according to claim 11, wherein the sliding window of time spans about 60 seconds and the predetermined timeslot interval is about 5 seconds.

13. The computer-readable medium according to claim 10, further comprising a step of distributing a load distribution for each respective channel resource among the plurality of servers based on the determined future load distribution for each respective server.

14. The computer-readable medium according to claim 13, wherein at least one load gradient is based on a difference between a total number of users connected to the server associated with the load gradient at an end of the predetermined interval of time and a total number of users connected to the server at a beginning of the predetermined interval of time.

15. The computer-readable medium according to claim 13, further comprising steps of:

creating a new channel resource;

assigning an initial estimated weight to the new channel resource; and assigning the new channel resource to a selected server of the plurality of servers based on the initial estimated weight associated with the new channel resource and a load distribution associated with each respective server of the plurality of servers.

16. A computer-readable medium having computer-executable instructions for performing steps comprising:

recording a number of users connected to the server at a beginning of a predetermined interval of time;

recording a number of users connected to the server at an end of the predetermined interval of time; and determining a difference between the total number of users connected to the server at the end of the predetermined interval of time and the total number of users connected to the server at the beginning of the predetermined interval of time.

17. The computer-readable medium according to claim 16, wherein the predetermined interval of time is a sliding window of time having a predetermined number of timeslots each having a predetermined timeslot interval.

18. The computer-readable medium according to claim 17, wherein the sliding window of time spans about 60 seconds and the predetermined timeslot interval is about 5 seconds.

\* \* \* \* \*